May 16, 1939.　　　　J. B. ARMITAGE　　　　2,158,649
PRECISION APPARATUS FOR MACHINE TOOLS
Filed Sept. 10, 1936　　　3 Sheets-Sheet 1

INVENTOR
JOSEPH B. ARMITAGE
BY W. D. O'Connor
ATTORNEY

May 16, 1939.　　　J. B. ARMITAGE　　　2,158,649
PRECISION APPARATUS FOR MACHINE TOOLS
Filed Sept. 10, 1936　　　3 Sheets-Sheet 2

INVENTOR
Joseph B. Armitage
BY W. D. O'Connor
ATTORNEY

May 16, 1939. J. B. ARMITAGE 2,158,649
PRECISION APPARATUS FOR MACHINE TOOLS
Filed Sept. 10, 1936 3 Sheets-Sheet 3
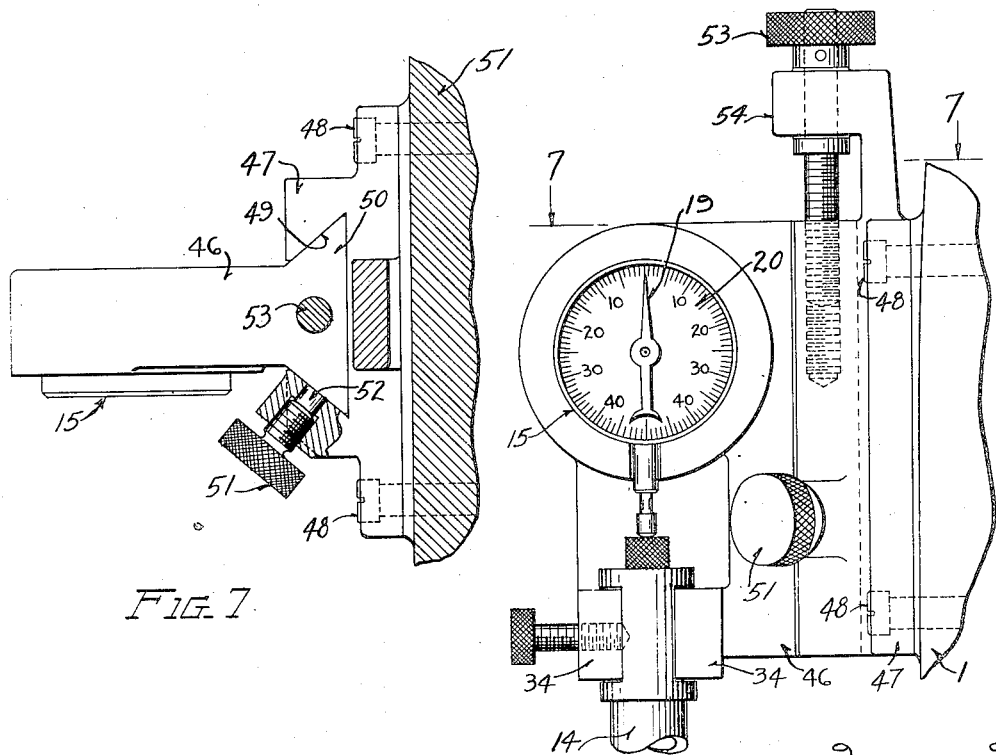
Fig. 7
Fig. 6
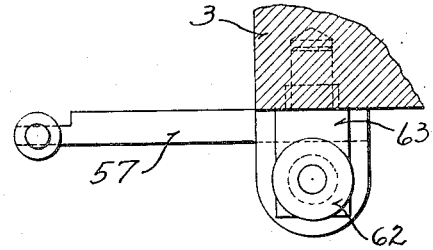
Fig. 9
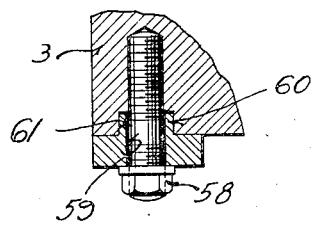
Fig. 10
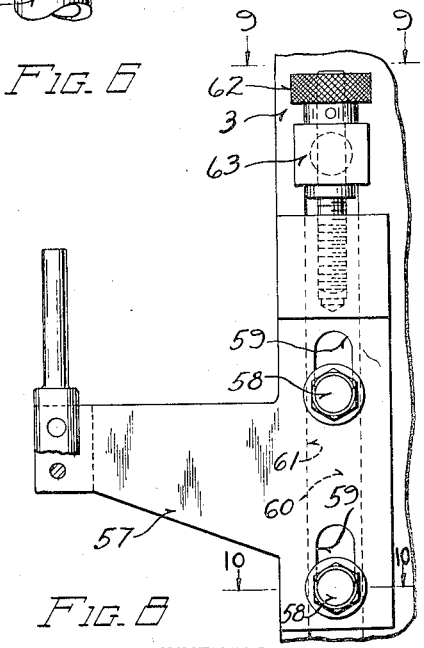
Fig. 8
INVENTOR
JOSEPH B ARMITAGE
BY W. D. O'Connor
ATTORNEY

UNITED STATES PATENT OFFICE 2,158,649

PRECISION APPARATUS FOR MACHINE TOOLS

Joseph B. Armitage, Wauwatosa, Wis., assignor to Kearney & Trecker Corporation, West Allis, Wis., a corporation of Wisconsin Application September 10, 1936, Serial No. 100,155

16 Claims. (Cl. 33—181)

This invention relates, generally, to machine tools and more particularly to precision measuring apparatus for accurately indicating the position of a movable part of a machine tool.

Machine tools are ordinarily provided with micrometer dials or similar distance indicating devices usually associated with the manually operated apparatus for adjusting relatively movable parts of the machine, for the purpose of guiding the machine operator in moving the machine parts through desired distances. For the usual machining operations indicating devices of this nature are sufficiently accurate, but for operations requiring a high degree of precision it is necessary to resort to additional refinements in the way of more accurate means capable of indicating precisely the relative position of the machine parts. To this end sensitive dial indicators have been utilized in conjunction with measuring rods of standard lengths, or other accurate measuring means of similar nature, but the use of these instruments on machine tools has ordinarily been found to be inconvenient and to involve tedious procedure.

It is a general object of this invention to provide an improved precision measuring apparatus that is particularly adapted for indicating the relative position of movable elements of a machine tool with a high degree of accuracy.

A more specific object of the invention is to provide an improved precision measuring apparatus adapted to utilize conveniently standard length distance measuring rods in conjunction with a sensitive dial indicator, for accurately positioning relatively movable elements of a machine.

Another object of the invention is to provide in a precision positioning apparatus, means for holding a plurality of standard length distance rods in an axially aligned column and in position to cooperate with a dial indicator.

Another object is to provide a precision measuring apparatus having a distance rod holder that may readily be detached and removed together with the rods held therein as a unit without disturbing the relative positions of the rods.

Another object is to provide a distance rod holding means adapted to support a plurality of distance rods of different lengths in manner to permit convenient rearrangement and substitution of rods in any desired combination to effect adjustment of the over-all length delimited thereby.

Another object is to provide a precision distance measuring apparatus for a machine tool that is of simple and rugged construction and that is adapted to be adjusted readily.

Another object is to provide a holder for a column of measuring rods that is adapted to be supported in operating position on a machine tool in manner to be removable readily therefrom for convenience in rearranging the rods held therein.

Another object is to provide a precision measuring apparatus utilizing rods and arranged for exerting a predetermined force axially upon the measuring rods to hold them in contact under substantially constant pressure.

Another object is to provide a precision indicating apparatus for a machine tool so arranged that the forces acting on the indicating apparatus are substantially constant under all conditions of load and position of the machine elements.

Another object is to provide a precision measuring apparatus particularly adapted for indicating with certainty vertical displacement of an element of a machine tool.

A further object is to provide a supporting means for distance rods that serves to protect the rods from injury and from inadvertent change in the adjustment thereof.

A still further object is to provide a precision measuring apparatus that is adjustable in manner to facilitate initial setting thereof relative to a work piece to be machined.

According to this invention, as it is applied to a particular machine tool, in this instance a milling machine of the knee type, the relative position of movable parts, in this case the vertical position of the milling machine knee on the frame, is indicated by precision apparatus including a column of axialy aligned measuring rods interposed between a dial indicator that constitutes a normally fixed abutment mounted on the frame of the machine in position to engage one end of the column of rods and an aligned abutment carried by the knee in position to engage the other end of the column of rods. The measuring rods are held in alignment in a vertical column by a container that is detachably secured to the machine frame in manner to be removable therefrom with the contained measuring rods for convenience in adjusting the length of the measuring unit. Adjustment of the unit is effected by removing from or adding to the column of rods in the container individual rods of appropriate length, a micrometer gage element being included with the rods for effecting fine adjustments. To insure accuracy during a measuring operation, the column of rods is subjected to a constant axial pressure by resilient means forcing the column against the movable abutment. A retainer is adjustably clamped within the container in position to engage the lower end of the column of rods to prevent the rods from dropping out when the container is detached from the machine. The container is preferably tubular in form and has a longitudinal slot in one side to accommodate the movable abutment. To facilitate setting the apparatus in establishing an initial relationship with a work piece on the machine, means may be provided for adjusting the measuring instrument relative to the machine. For this purpose either the normally fixed abutment or the relatively movable abutment may be made adjustable.

The foregoing and other objects of the invention, which will become more fully apparent from the following detailed specification, may be achieved by the particular precision apparatus described by way of example as preferred embodiments of the invention, in connection with the accompanying drawings, in which:

Fig. 2 is an enlarged view partly in side elevation and partly in vertical medial section of the measuring apparatus shown in Figure 1, parts of the milling machine being shown in outline;

Fig. 3 is another view of the measuring apparatus similar to Fig. 2, but taken partly in front elevation and partly in vertical medial section;

Fig. 7 is a view partly in plan and partly in horizontal section taken on the plane represented by the line 7—7 in Fig. 6;

Fig. 8 is an enlarged fragmentary view in side elevation of the lower or movable abutment portion of measuring apparatus embodying another modification of the invention;

Fig. 9 is a view partly in plan and partly in horizontal section taken on the plane represented by the line 9—9 in Fig. 8; and Fig. 10 is a view in horizontal section taken on the plane represented by the line 10—10 in Fig. 8.

Figure 1:
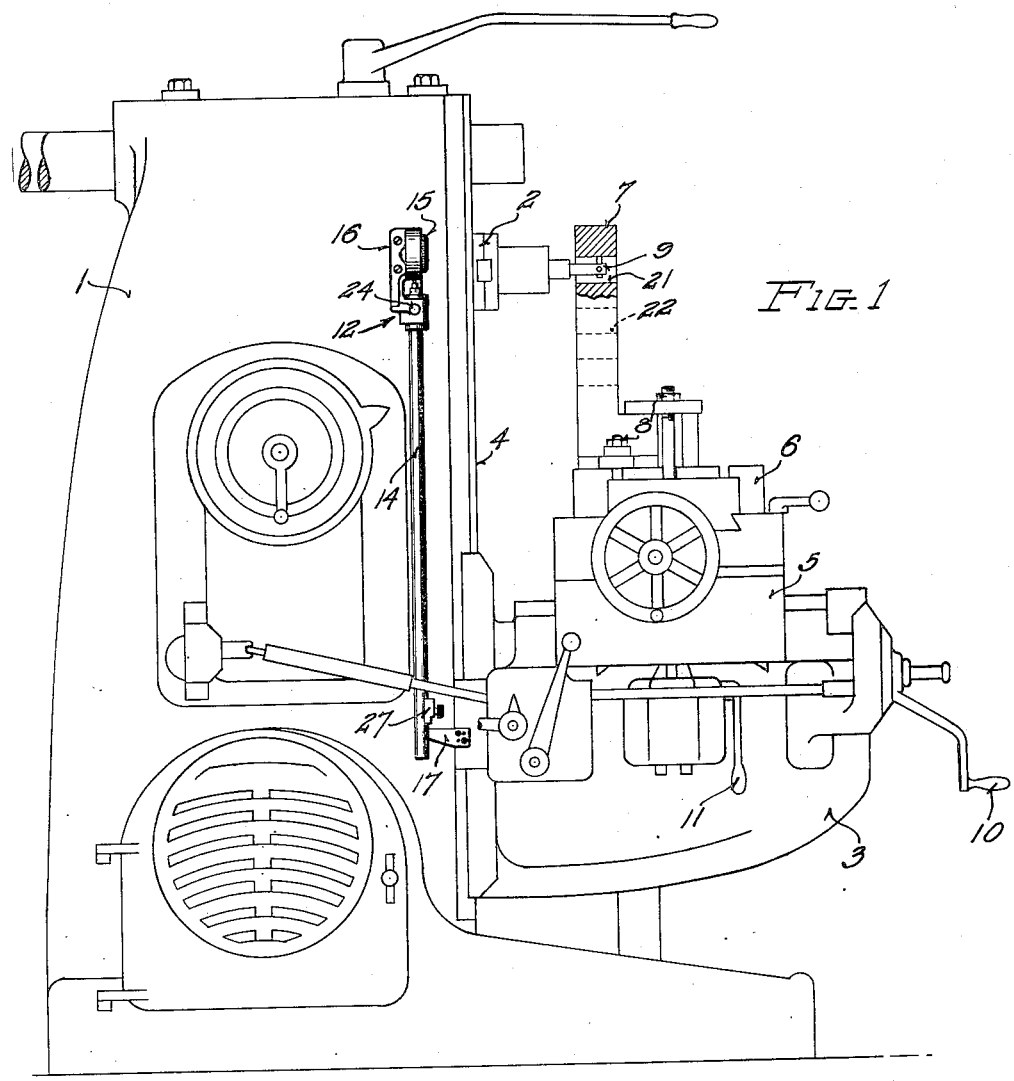
Figure 1 is a view in left side elevation of a knee and column type milling machine incorporating a precision distance measuring apparatus embodying the novel features of this invention.

Referring more specifically to the drawings, the particular machine illustrated therein, as a typical example of a machine tool adapted to utilize precision measuring apparatus embodying the present invention, is a milling machine of the well known knee and column type. As shown in Fig. 1, the milling machine comprises essentially a base and upstanding column structure 1, having rotatably mounted in its upper part a tool spindle 2 and having a knee structure 3 slidably mounted for vertical movement along its forward wall or face 4. The knee structure 3 is arranged to carry a saddle 5 that is slidably mounted thereon for horizontal movement toward or from the face 4 of the column and that carries, in turn, a work supporting table 6 mounted for horizontal longitudinal movement in a line parallel with the face of the column and transversely to the axis of the tool spindle. Driving means of well known type are provided within the column 1 for rotating the tool spindle and for effecting power actuation of the knee, saddle and table in their three mutually transverse paths of movement relative to the tool spindle.

A representative work piece 7 is shown fastened to the table 6 by clamps and bolts 8 in position to be operated upon by a single-point boring tool 9 mounted in the tool spindle 2, the work piece being arranged to be fed to the tool by moving the saddle 5 horizontally along the knee 3. To position the work piece vertically relative to the boring tool, the knee 3 is moved along the face of the column, preferably manually by actuating an elevating crank 10 that functions to elevate or lower the knee in well known manner. After the desired vertical adjustment of the work piece has been made, the knee may be clamped rigidly to the column by clamping mechanism actuated by a knee clamping lever 11.

The particular work piece 7 is shown as having a plurality of previously formed horizontally disposed openings that are roughly bored and approximately spaced, as might be made by drilling the work piece with an ordinary drill somewhat smaller than the desired finished opening, mounted in the tool spindle 2, the piece being positioned for successive drilling operations by means of the usual micrometer dial work adjusting mechanism, or the like. In order to machine the work piece 7 to precise dimensions, as for instance to bore accurately each of the plurality of previously drilled horizontal openings therein and to space them vertically in highly accurate relationship, it is necessary that the knee 3 be adjusted vertically with great care and precision.

To provide for positioning the knee vertically with the necessary degree of accuracy, the milling machine is provided with a precision measuring or indicating instrument or apparatus 12 embodying the present invention and shown mounted on the left side of the machine column 1 in proximity to the vertically movable knee 3. The measuring instrument 12 is preferably constituted as an independent attachment which may be applied to or removed from the milling machine without in any way affecting the normal operation of the machine.

As shown in the drawings, the measuring apparatus or instrument 12 is of the type utilizing a measuring or distance unit constituted by a plurality of distance pieces or measuring rods 13 of known lengths arranged coaxially in an aligned column, the column of rods being interposed between abutments disposed, respectively, on relatively movable elements of the machine, in this instance on the knee and column, respectively, of the milling machine.

In order to maintain the column of measuring rods 13 in vertical alignment and to protect them from injury or from inadvertent change in the adjustment of the length of the measuring unit, the rods 13 are disposed within a holder or container 14. The container 14 is preferably in the form of a tube or cylinder of internal diameter suitable to slidingly receive the rods 13 and it is detachably secured to a part of the instrument that is rigidly mounted on the machine. The upper end of the column of rods 13 is disposed to act upon a sensitive dial indicator device 15 which constitutes, in general effect, one of the abutments of the measuring instrument, the one fixed to the column of the machine. As shown, the dial indicator 15 is mounted in a bracket 16 which is removably attached to the side of the column by screws or the like and is arranged to detachably receive the upper end of the tubular container 14. The other abutment of the measuring instrument is disposed in vertical alignment with and movable relative to the fixed dial indicator 15 and is constituted by a rearwardly extending bracket or abutment member 17 removably attached to the vertically movable knee 3 by screws and dowels and arranged to operate vertically in a narrow longitudinal slot 18 in the forward side of the tube 14 in a manner to engage the bottom of the column of measuring rods 13 to move them vertically relative to the dial indicator on the column 1. The dial indicator 15 may be of the usual commercial type having a pointer 19 operating over a face or dial 20 preferably graduated in ten-thousandths of an inch and it is so constructed that the dial face may be turned manually, by means of a knurled rim, relative to the pointer to set the indicator at zero.

To establish an initial definite relationship of the measuring instrument 12 with the cutting tool and the work piece, the knee 3 is first positioned, by actuating the crank 10, to bring the work piece 7 into proper relation with the cutting tool 9 for boring the first hole, and the knee is then clamped to the column by actuating the clamping lever 11, the length of the measuring unit having previously been so adjusted that when the work piece is moved to the initial position, the movable abutment 17 will lift the rod column into engagement with the dial indicator 15 to move the pointer 19 from its position of rest. After the knee has been clamped, the dial 20 of the indicator is turned manually to bring the zero on the dial into coincidence with the pointer 19, thereby establishing the initial reading. With the measuring instrument so adjusted and the dial set at zero, the work piece 7 is then fed to the boring tool 9 by moving the saddle 5 toward the column 1, preferably by power, to accurately machine the first roughly drilled hole, as for instance a hole 21 shown in process of being finished by the boring tool 9 in Fig. 1.

To accurately position the work piece 7 for finishing a second hole, as for instance a previously drilled hole 22, in precise vertical relationship with the first hole 21, the column of measuring rods 13 of the measuring instrument 12 is adjusted by shortening it an amount exactly equal to the desired vertical distance between the center lines of the holes 21 and 22. The knee 3 is then moved to the precise position at which the dial indicator 15 again indicates zero, thereby moving the work piece 7 the necessary amount to so position it that the boring tool 9 will form the second hole 22 at precisely the desired distance from the first hole 21.

In order that the measuring unit consisting of the column of measuring rods 13 within the tube 14 may be adjusted readily to remove from or add to the length delimited thereby a desired increment, the container tube 14 together with the rods 13 contained therein is arranged to be removed as a unit from the machine by loosening a clamp screw 24 disposed to secure the top of the tube to the bracket 16. The tube 14 is then tilted forward to free it from the bracket 16 and to position it to be lifted upward out of engagement with the abutment 17, the knee being lowered if necessary. It may then be removed and taken to a convenient place for adjusting the length of the column of measuring rods.

The measuring rods 13 are ordinarily available commercially in standard lengths usually in accurate multiples of whole inches, and individual rods may be withdrawn from or added to the column through the bottom or open end of the tube 14 to effect the desired change in length of the column by increments of whole inches. To effect changes in length of the column involving fractions of an inch, the column of rods is provided with an adjustable spacing element or micrometer gage 25 of the usual construction adapted to be adjusted by ten-thousandths of an inch increments throughout a range of one inch. By properly selecting rods 13 to effect the desired change in length equal to the number of whole inches and then adjusting the micrometer 25 to effect a change in length equal to the desired additional fraction of an inch, the column of measuring rods may be adjusted to any length by increments of ten-thousandths of an inch within the range of the instrument.

Figure 5:
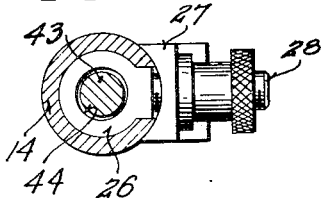
Fig. 5 is a detail view in horizontal section taken approximately along the plane represented by the line 5—5 in Fig. 2.

After the measuring unit has been adjusted accurately to the desired length, the measuring rods 13 and the micrometer 25 are replaced within the tube 14 and are retained therein by means of a retaining member 26 of annular shape that is fitted within the tube beneath the rods to prevent them from falling out when the tube is being removed from or replaced on the machine. The retainer 26 is arranged to be clamped in any desired position longitudinally of the tube by means of a clamping member 27 on the outside of the tube that cooperates with a clamping screw 28 extending through the slot 18, in the side of the tube, as shown in Figs. 2, 3, and 5. When the stop member 26 is placed within the tube it may be moved inwardly against the end of the column of rods a sufficient distance to bring them into contact with one another and to force them against a resilient abutment means at the other end of the tube 14. The resilient means includes a vertically movable plunger 29 in the upper end of the tube 14 that is forced inwardly of the tube against the column of rods by means of a spring 31 which exerts a pressure sufficient to maintain the measuring rods 13 in positive contact with one another.

Figure 4:
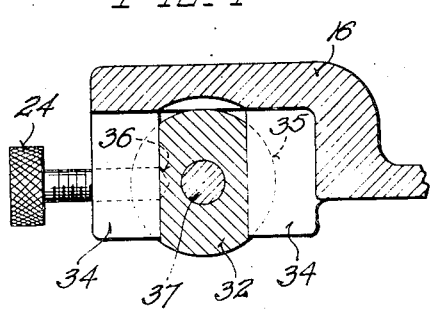
Fig. 4 is a detail view in horizontal section taken approximately along the plane represented by the line 4—4 in Fig. 3.

The tube 14 and the column of measuring rods contained therein may then be replaced upon the machine by fitting the lower end of the tube over the movable abutment 17 and then lowering the tube until the upper end thereof is in position to engage the bracket 16. As shown in Figs. 2, 3, and 4 the upper end of the tube 14 is provided with an end piece or bushing 32 having a cylindrical portion of reduced diameter fitting within the upper end of the tube that constitutes a shoulder abutting the upper end of the spring 31 and is secured within the tube by means of a pin 33. The main portion of the end piece 32, which extends above the end of the tube 14, is of generally cylindrical shape but is provided with flattened sides for fitting in a slot formed between projecting bosses 34 on the bracket 16, the disklike parts of the end piece above and below the flattened portion constituting end collars 35 that pass over and under the bosses 34 respectively. One side of the flattened portion is provided with a counter-sunk depression 36 for receiving the end of the clamping screw 24 which is threaded in the left boss 34, as seen in Fig. 3.

The spring pressed plunger 29 is provided with an upwardly extending shaft portion 37 of reduced diameter that passes through a central opening extending longitudinally of the end piece 32 and projects above the upper end of the tube 14, constituting an indicating element that is moved in accordance with the position of the upper end of the column of measuring rods in the tube. The upper end of the plunger shaft portion 37 is threaded to receive a stop member or nut 38 that is arranged to be forced down into engagement with the upper end of the bushing 32 by the spring 31 to limit movement of the plunger 29 inwardly to the tube. The top of the nut 38 presents an anvil surface disposed to engage a spring pressed stem or feeler 39 of the dial indicator 15 that is operatively connected to move the pointer 19 to register movement of the measuring rod column upon the dial 20 of the indicator.

As shown in Figs. 2 and 3, the abutment 17 carried by the vertically movable knee 3 is of reduced width to permit it to pass through and slide within the narrow slot 18 in the side of the tube 14, and it carries on its end within the tube 14 an upwardly extending cylindrical boss 43 that is adapted to project upwardly through a central opening 44 in the annular retaining member 26 a sufficient distance to abut against the bottom of the column of measuring rods within the tube.

After the tube has been replaced on the machine subsequent to adjusting the length of the column of measuring rods therein, to provide for movement of the work piece 7 a predetermined distance vertically relative to the cutting tool 11, as previously explained, the knee 3 carrying the work piece 7 and the abutment 17 is moved upwardly by means of the elevating crank 10 to bring the boss 43 of the abutment into contact with the lower end of the column of measuring rods, thereby moving the rods upwardly into contact with the plunger 29. Further upward movement of the knee 3 will then result in lifting the column of measuring rods and thereby moving the spring pressed plunger 29 upward against the stem 39 of the dial indicator 15 in manner to move the pointer 19 over the dial 20.

To finally position the workpiece 7 accurately for making the second cut, as for instance for boring the second hole 22, the operator moves the knee 3 upward gradually by means of the crank 10 until the pointer 19 of the indicator returns to the zero position on the dial 20, thus showing that the knee has been moved the distance corresponding to the change in length of the column of measuring rods within the tube 14.

In clamping the knee 3 to the column 1 by the clamping lever 11 after it has been moved to its new position, it may happen that the vertical position of the knee will be changed slightly and that the indicator will, consequently, be moved from its zero position. In that event it will be necessary to unclamp the knee and readjust it vertically to compensate for the change resulting from the clamping action. This readjustment of the knee may be effected readily by observing on the dial indicator the amount of the error that resulted from the clamping action and then moving the knee by an amount sufficient to compensate for this error. Clamping of the knee should then cause the indicator to move to the zero position. If the desired degree of accuracy is not attained at the first trial, the process may be repeated until the position of the knee is found to be within the prescribed limits.

The dial indicator 15 constitutes in effect a stationary but resilient abutment on the column 1 and the movements of the movable abutment 17 on the knee 3 which it records, are transmitted directly to it through the column of measuring rods and the plunger 29 entirely independently of the tube 14 or any other supporting structure and independently of the means for supporting or moving the knee. Consequently, the indication of movement of the work piece by the dial indicator is not affected by any variation in the vertical position in which the tube 14 happens to be clamped to the bracket 16, as the result of removal and replacement of the tube on the machine. Further, the spring pressed plunger 29 functions to exert exactly the same axial pressure on the column of rods each time that the work piece is moved to a new position, thereby causing the various abutting surfaces in the column to engage with exactly the same pressure for each location to insure accuracy.

Any number of holes, within the range of the machine, may be finished successively in accurate relation with each other in accordance with the foregoing process, and the apparatus may be used for accurately forming plane surfaces at different elevations or for other purposes such as checking the accuracy of the relative positions of previously formed holes or surfaces.

When it is desired to repeat a series of operations each involving several settings of the machine, it is convenient to provide a corresponding number of the tube units, one unit being adjusted for each one of the settings. The units may then be used one after another in proper sequence throughout each of the repeated series of operations without further adjustment.

Figure 6:
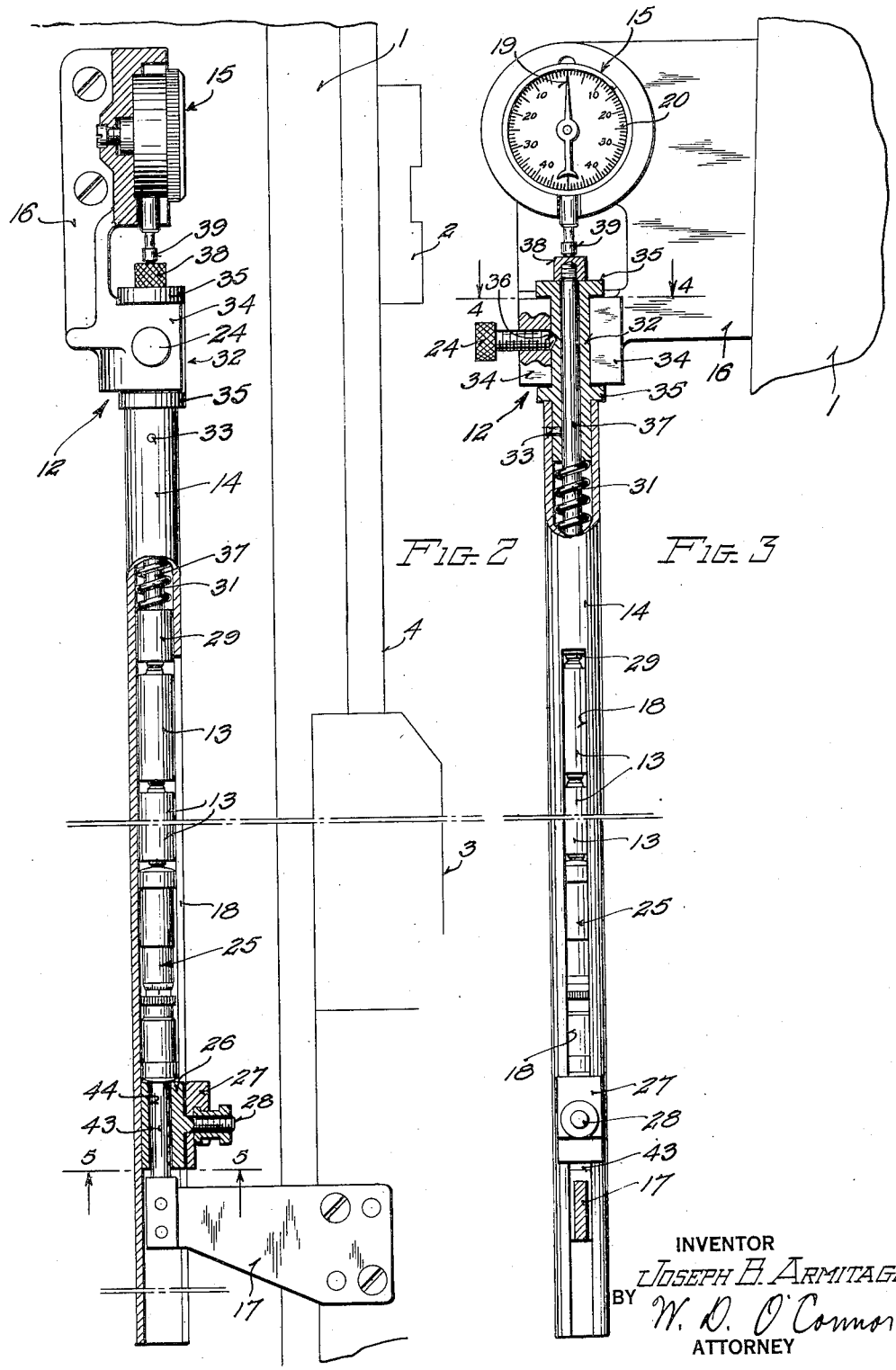
Fig. 6 is an enlarged fragmentary view in front elevation of the upper part of measuring apparatus embodying a modification of the invention.

In order to facilitate setting the machine in establishing an initial desired relationship between the cutting tool, the work piece and the measuring instrument, either the upper normally stationary abutment or the lower relatively movable abutment may be made adjustable relative to its supporting element. As shown in Figs. 6 and 7, the normally stationary abutment member carrying the dial indicator 15 may be modified in such manner as to be movable for vertical adjustment relative to the machine column. For this purpose the indicator 15 and the tube supporting bosses 34 are mounted on a bracket 46 of modified form that is slidably mounted for vertical adjustment on a plate 47 which is secured by screws 48 to the side of the machine column. As may best be seen in Fig. 7, the plate 47 is provided with a vertically disposed dovetail groove 49 that receives a complementary tongue 50 on the bracket 46. A knurled clamping thumb-screw 51 is threaded in a boss at one side of the plate 47 in position to force a clamping plug 52 against the tongue 50 to clamp the slidable bracket in the desired position. To effect controlled vertical movement of the bracket 46, a knurled adjusting screw 53 is journalled in an upwardly projecting arm 54 on the plate 47 and has threaded engagement with the tongue of the bracket 46, whereby turning the screw results in adjusting the bracket vertically.

In effecting an initial setting of the measuring instrument, the machine is adjusted to bring the work piece into proper relation with the cutting tool for making the first cut, the column of measuring rods having been previously adjusted roughly to approximately the length required to establish the dial indicator at its zero position. The clamping screw 51 is then released and the adjusting screw 53 is turned to so position the movable bracket 46 relative to the column of rods that the pointer 19 of the indicator will indicate zero or nearly zero. The clamping screw 51 is then tightened, after which the dial 20 of the indicator may be turned to set the indicator exactly at zero. The machining and subsequent positioning operations may then proceed from this point in the manner that has been described previously.

Adjustment of the instrument to establish zero setting of the indicator may be accomplished in similar manner by means of an adjustable lower or relatively movable abutment shown in Figs. 8, 9 and 10. As may be seen in Fig. 8, a modified lower or movable bracket or abutment member 57 is mounted for vertical adjustment on the knee 3 by means of spaced clamping bolts or studs and nuts 58 extending through vertically disposed slots 59 in the bracket and threaded into the knee 3. The bracket 57 is provided on its inner side with a tongue 60 fitting in a vertical groove 61 in the knee, as shown in Fig. 10, in manner to move vertically therein when the clamping bolts 58 are loosened. For moving the bracket 57, an adjusting screw 62 is journaled in a boss 63 that is secured to the knee 3, as shown in Fig. 9, the screw being threaded into the top of the bracket.

After the rod column length is established approximately and the work piece positioned relative to the cutting tool, as previously explained, the bracket 57 may be adjusted vertically by means of the screw 62 to move the rod column in manner to bring the indicator substantially to zero position.

The clamping bolts 58 may then be tightened and the final adjustment effected by turning the dial 20 to set the indicator exactly at zero as before.

From the foregoing descriptions of typical embodiments of this invention, it is apparent that apparatus of the types shown and described herein constitute simple and effective precision measuring apparatus for measuring vertical movements of a machine tool element which may be adjusted readily to provide for precise movement of a work piece between successive cutting operations. Further, it is evident that the tubular container for the column of distance rods provides effective protection for the rods against injury or inadvertent change in adjustment of the column length and provides convenient means for handling the assembled column of rods as a unit to facilitate changing the adjustment thereof.

Although the measuring instrument has been shown and described herein as it is applied to a milling machine for measuring vertical movement of the knee element thereof, it is apparent that apparatus embodying the invention may be applied to other types of machines and in other positions thereon, or used in conjunction with measuring instruments of other kinds without departing from the spirit and scope of the invention as defined in the subjoined claims.

I claim as my invention:

1. The combination with a machine tool including a stationary member and a movable member, said movable member being slidably mounted on said stationary member, of measuring apparatus for indicating relative positions of said members, comprising a bracket carried by said stationary member, a dial indicator mounted on said bracket, an abutment carried by said movable member, and a tubular container for measuring rods detachably secured to said bracket in position to interpose measuring rods contained therein in axial alignment between said abutment and said dial indicator, said tubular container being removable therefrom with its contained measuring rods as a unit, whereby the column of measuring rods therein may conveniently be rearranged to establish a desired total length thereof for interposition between said dial indicator and said abutment.

2. A position indicating instrument for relatively movable machine elements, comprising a tube for holding aligned distance pieces and having a longitudinal slot, said tube being carried by one of said machine elements, a plunger slidably mounted within one end of said tube, a spring disposed to resiliently urge said plunger inwardly of said tube against one end of a column of distance pieces therein, an abutment carried by another of said machine elements and adapted to slide within said slot in said tube to engage the other end of a column of distance pieces therein in manner to force them against said plunger, and means associated with said plunger for indicating the position of said sliding abutment as measured by the column of distance pieces.

3. A position indicating instrument for relatively movable machine elements, comprising a tube for holding aligned distance pieces and having a longitudinal slot said tube being carried by one of said machine elements, a plunger slidably mounted within one end of said tube, a spring disposed to resiliently urge said plunger inwardly of said tube against distance pieces therein, a retaining member adapted to slide within said tube and to be clamped thereto in adjusted position for retaining a desired number of distance pieces therein, a slidable abutment carried by another of said machine elements and extending through said slot for engaging distance pieces in said tube to move them out of contact with said retaining member and against the force exerted by said spring pressed plunger, and means associated with said plunger for indicating the position of said slidable abutment as measured by the distance pieces.

4. A measuring instrument for indicating vertical displacement of a machine tool element, comprising a tube having a longitudinal slot, said tube being disposed vertically on a machine tool, a plurality of distance pieces disposed in an axially aligned column within said tube, means on a vertically movable element of said machine tool extending through said slot in said tube and engaging the lower end of said column of distance pieces for moving said distance pieces within said tube, and means associated with the upper end of said column of distance pieces for indicating the position thereof, whereby the vertical position of said movable element may be determined in accordance with the length of said column of distance pieces.

5. A precision apparatus for a machine tool, comprising a plurality of standard length measuring rods arranged in a column, means including a detachable tubular container enclosing said rods throughout the length of said column in manner to retain them in column arrangement and to support them in a predetermined position on a machine tool, and means for adjusting the longitudinal position of said tubular container for establishing an initial relationship between said column of rods and said machine tool.

6. In a machine tool, the combination with a plurality of relatively movable elements, of a distance measuring apparatus comprising a distance unit receiving tube having a longitudinal slot in one side thereof, a distance unit comprising a plurality of standard length measuring rods disposed within said tube, an indicating element disposed within said tube in manner to extend from one end thereof and to engage one end of said distance unit therein, a tubular retaining member disposed within said tube to engage the other end of said distance unit, means extending through said slot in said tube for clamping said retaining member to said tube, resilient means disposed to engage said indicating element to force it against said distance unit for urging said measuring rods thereof into close contact with each other and against said retaining member, means fixing said tube to one element of said machine tool, and means carried by another relatively movable element of said machine tool and extending through said slot in said tube and through said tubular retaining member for engaging the adjacent end of said distance unit to move said distance unit and said indicating element relative to said tube in manner to indicate the amount of relative movement between said machine elements.

7. In a precision apparatus for a machine tool having relatively movable elements, the combination with a sensitive movement indicating instrument adapted to be carried by one element of the machine tool and an abutment carried by a relatively movable element of the machine tool, of a plurality of standard length distance rods arranged in an axially aligned column and interposed between said indicating instrument and said abutment, and means retaining said column of rods in alignment, said means being detachably supported on said machine and removable therefrom with said column of rods retained therein in their aligned arrangement.

8. In a machine tool the combination of a plurality of relatively movable supports, manual means for relative movement therebetween, a plurality of abutment elements respectively carried by the different supports and spaced apart in the direction of said relative movement, a plurality of spacing elements aligned end to end between said abutments, one of said elements comprising an adjustable micrometer device, a retainer for said elements including means unitarily removable and replaceable therewith to effect said position between the abutments, and means for aligning and removably supporting said retainer.

9. In a measuring device for a machine tool, the combination with two relatively movable machine elements, of a tubular member mounted on one of said machine elements in fixed relation thereto, a distance unit comprising a plurality of standard length measuring rods disposed within said tubular member and positioned thereby in axial alignment, retaining means clamped within said tubular member in position to engage one end of said distance unit to limit movement thereof, means carried by the other of said machine elements and extending through said retaining means into engagement with said distance unit to move it, and means engaging the other end of said distance unit including resilient means disposed to exert a predetermined pressure thereon holding said rods in close contact and an indicating device operatively disposed to indicate relative movement of said machine elements.

10. A measuring attachment for a machine tool, comprising a bracket adapted to be attached to one element of a machine tool, a slotted tube of internal diameter to slidably receive distance pieces in axial alignment, said tube being detachably secured at one end to said bracket, an abutment adapted to be secured to a second element of said machine tool movable relative to said first element, said abutment being adapted to move in the slot of said tube upon relative movement of said elements to move distance pieces axially within said tube, a dial indicator carried by said bracket adjacent to the end of said detachable tube, and resiliently mounted means in the end of said detachable tube disposed to be moved by distance pieces in said tube and positioned to engage said dial indicator to register relative movements of the elements of said machine tool.

11. In a machine tool, the combination of a plurality of relatively movable supports, manual means for relative movement therebetween, a plurality of abutment elements respectively carried by the different supports and spaced apart in the direction of said relative movement, a plurality of spacing elements aligned end to end between said abutments, a retainer for said elements including means unitarily removable and replaceable therewith to effect said position between the abutments, support means for aligning and removably supporting said retainer, and spring means carried by said retainer for establishing equal pressure between different pairs of said elements in the direction of alignment of said abutments.

12. In a machine tool, the combination of a plurality of relatively movable supports and means for spacing said supports in various positions of their relative movement including manual means for movement of one of the supports, an indicator device carried by one of the supports and providing an abutment movable relative to the support upon which the indicator is carried, another abutment carried by the other support, said abutments being aligned in a plane parallel to the path of relative support movement, a carrier, a plurality of spacing elements slidably carried by said carrier in end to end relationship whereby to add the spacing effect thereof, said carrier providing a slideway portion slidably retaining said elements in said end to end position as a unit, and means for removably supporting said carrier unit in position to align said elements in said plane in position for spacing said abutments.

13. A movement measuring device for indicating relative movements of elements of a machine tool, comprising a tube having a longitudinal slot extending from one end thereof to near the other end thereof, means securing said tube to one of said elements of said machine tool, means on another element of said machine tool extending through said slot in said tube and slidable therein upon relative movement of said elements, a plurality of standard length distance pieces disposed coaxially within said tube forming a column with one end resting against said movable means extending through said slot, and indicating means operatively associated with the other end of said column of distance pieces in manner to indicate relative movement of said machine elements.

14. A position indicating instrument, comprising a tube having a longitudinal slot, a plunger disposed within one end of said tube, a spring engaging said plunger in manner to urge it inwardly of said tube, a plurality of distance pieces fitted within said tube to slide therein in axial alignment and disposed in abutting relation to said plunger, a retaining member disposed in said tube and clamped thereto in position to abut said distance pieces and retain them in said tube, and means adapted to slide in said slot for engaging said distance pieces to move them out of contact with said retaining member and against the resistance of said spring-pressed plunger, whereby said plunger is moved to indicate a change in position of said sliding means.

15. In a measuring attachment for a machine tool, in combination, a bracket adapted to be secured to one element of a machine tool, a dial indicator carried by said bracket, a tubular distance piece receiving member detachably carried by said bracket, means in one end of said tubular member for engaging distance pieces therein and for engaging said dial indicator in a manner to actuate said indicator in response to movement of said distance pieces, means within said tubular member for retaining distance pieces therein in engagement with said distance piece engaging member, and an abutment adapted to be secured to a relatively movable second element of said machine tool to engage distance pieces in said detachable tubular member in a manner to move said pieces and said distance piece engaging member, thereby actuating said dial indicator to indicate relative movement of said elements of said machine tool.

16. A position indicating instrument for indicating vertical displacement of a machine tool element, comprising a tube having a longitudinal slot and adapted to be supported in vertical position on a stationary element of a machine tool, a plurality of standard length distance pieces disposed in an axially aligned column within said tube, a retaining member clamped in said tube in position to engage the lower end of said column of distance pieces to retain said pieces within said tube, a spring pressed indicating plunger disposed within the upper end of said tube in manner to resiliently engage the top of said column of distance pieces and to indicate the position thereof within said tube, and means adapted to be carried by a movable element of said machine tool and disposed to slide in said slot and to engage the lower end of said column of distance pieces to move said pieces and said spring-pressed plunger in manner to indicate displacement of said movable element relative to said stationary element of said machine tool.

JOSEPH B. ARMITAGE.